United States Patent [19]
Colson

[11] 3,847,169
[45] Nov. 12, 1974

[54] SHRIMP WASHERS
[76] Inventor: Ralph E. Colson, St. George, Maine
[22] Filed: Feb. 15, 1973
[21] Appl. No.: 332,620

[52] U.S. Cl. .................. 134/183, 99/536, 134/104, 134/110, 134/199
[51] Int. Cl. ............................................. B08b 3/02
[58] Field of Search .......... 134/104, 110, 111, 182, 134/183, 198–201; 99/516, 536

[56] References Cited
UNITED STATES PATENTS

| 786,402 | 4/1905 | Beal | 134/104 X |
| 1,245,768 | 11/1917 | Randall | 134/198 UX |
| 2,573,128 | 10/1951 | Cavicchioli | 134/104 |
| 2,600,638 | 6/1952 | Gollong | 134/198 X |
| 3,181,541 | 5/1965 | Brooking | 134/199 X |
| 3,261,368 | 7/1966 | Owens et al. | 134/199 X |
| 3,338,251 | 8/1967 | Nobili | 134/198 X |
| 3,500,840 | 3/1970 | Maatz | 134/182 X |

FOREIGN PATENTS OR APPLICATIONS

| 93,144 | 10/1938 | Sweden | 134/199 |

Primary Examiner—Robert L. Bleutge

[57] ABSTRACT

A batch washer for shrimp is disclosed as a pan having its bottom provided with drainage ports closed by removable screened overflows that are surrounded by a header connectable to a source of water under pressure and provided with jet-establishing ports spaced lengthwise thereof and directed downwardly and inwardly to create water turbulence that is effective to clean the shrimp of eggs, mud and other dirt.

4 Claims, 6 Drawing Figures

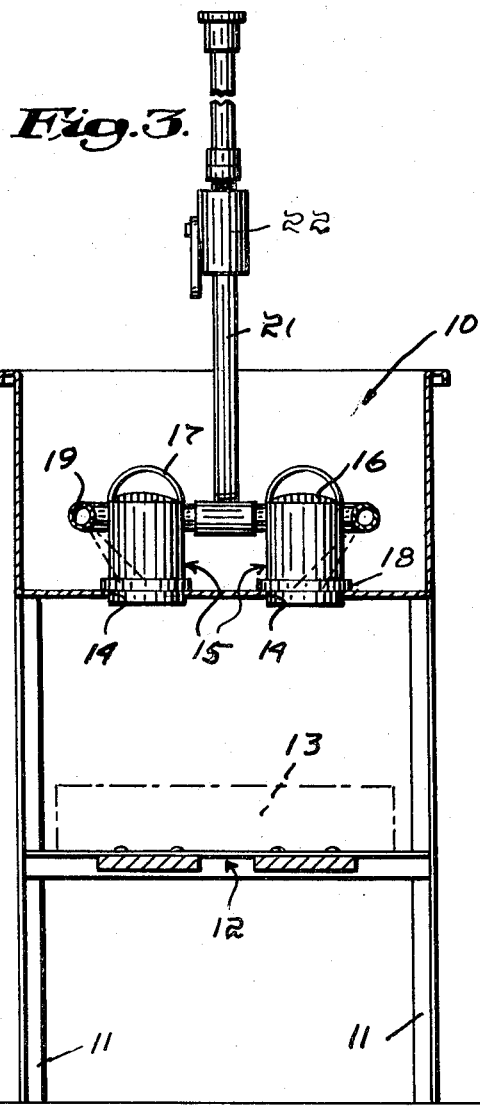
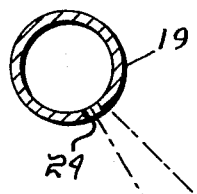
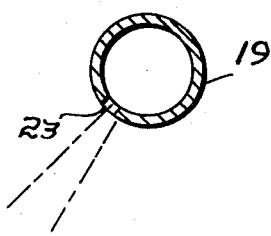
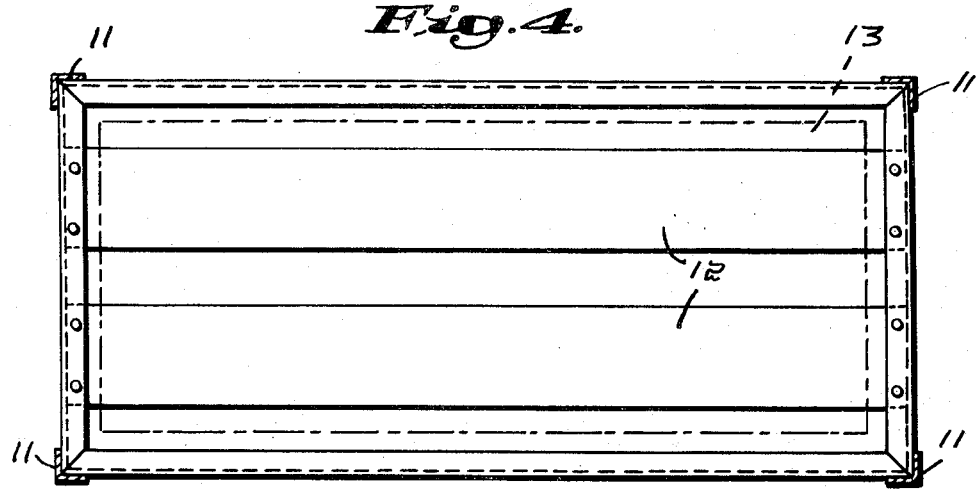

SHRIMP WASHERS

BACKGROUND OF THE INVENTION

Shrimp, as received from the fishermen, need to be washed before being processed to rid them of eggs, mud, and dirt. As such washing cannot be effectively accomplished by a simple flushing, special equipment is provided. Such equipment is relatively large and expensive and has the further disadvantage that considerable abrasion results.

THE PRESENT INVENTION

The objective of the present invention is to provide a washer for shrimp that will cleanse a batch quickly and thoroughly and yet be of moderate cost and of such a size that small floor space is required and that permits it to be easily moved to storage, if desired, at the end of the shrimp fishing season.

In accordance with the invention, this general objective is attained by providing a pan in which a header is supported that has portions defining a field for a batch of shrimp and in which there are baffle means. Opposed portions of the header have jet-establishing ports spaced lengthwise thereof and downwardly and inwardly inclined. With the header in communication with a source of water under pressure and a batch of sprimp in the pan, such turbulence is created that as the shrimp are swirled about, they are freed of eggs, dirt, and mud.

Another objective of the invention is to have the baffle means also function as an overflow and yet another objective is to have the baffle means in the form of a series of screened overflows with at least some of them also functioning as removable plugs closing drainage ports in the pan bottom.

A further objective of the invention is to provide a side wall of the pan with vertically spaced drainage ports through which water-borne dirt may escape as the water level builds up in the pan.

Yet another objective of the invention is to provide the header portions with two series of jet-establishing ports each of them downwardly inclined at an angle different from that of the other and preferably with the ports of the two series being alternated.

BRIEF DESCRIPTION OF THE DRAWINGS

The accompanying drawings illustrate a preferred embodiment of the invention of which

FIG. 3 is a section taken approximately along the indicated lines 2—2 of FIG. 2;

FIG. 4 is a section taken approximately along the indicated lines 4—4 of FIG. 2;

FIG. 5 is a section through the header showing one of the jet-establishing ports of one series thereof; and FIG. 6 is a like section but showing one of the jet-establishing ports of the other series.

THE PREFERRED EMBODIMENT OF THE INVENTION

Figure 1:
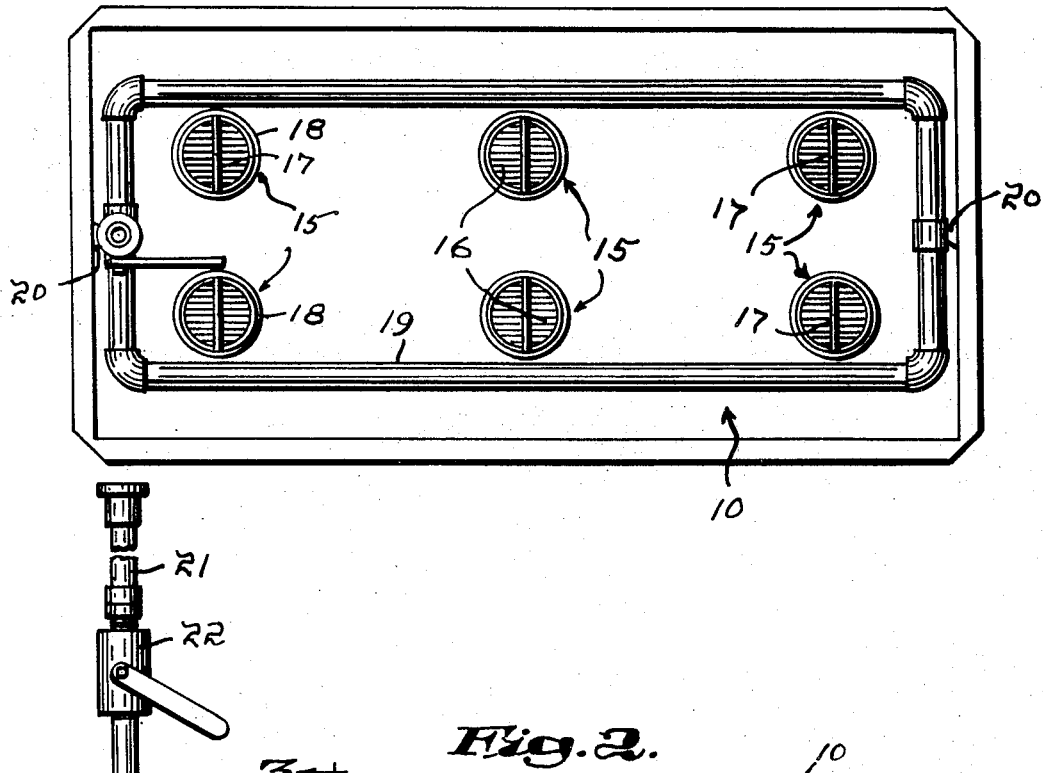
FIG. 1 is a top plan view of the washer.
Figure 2:
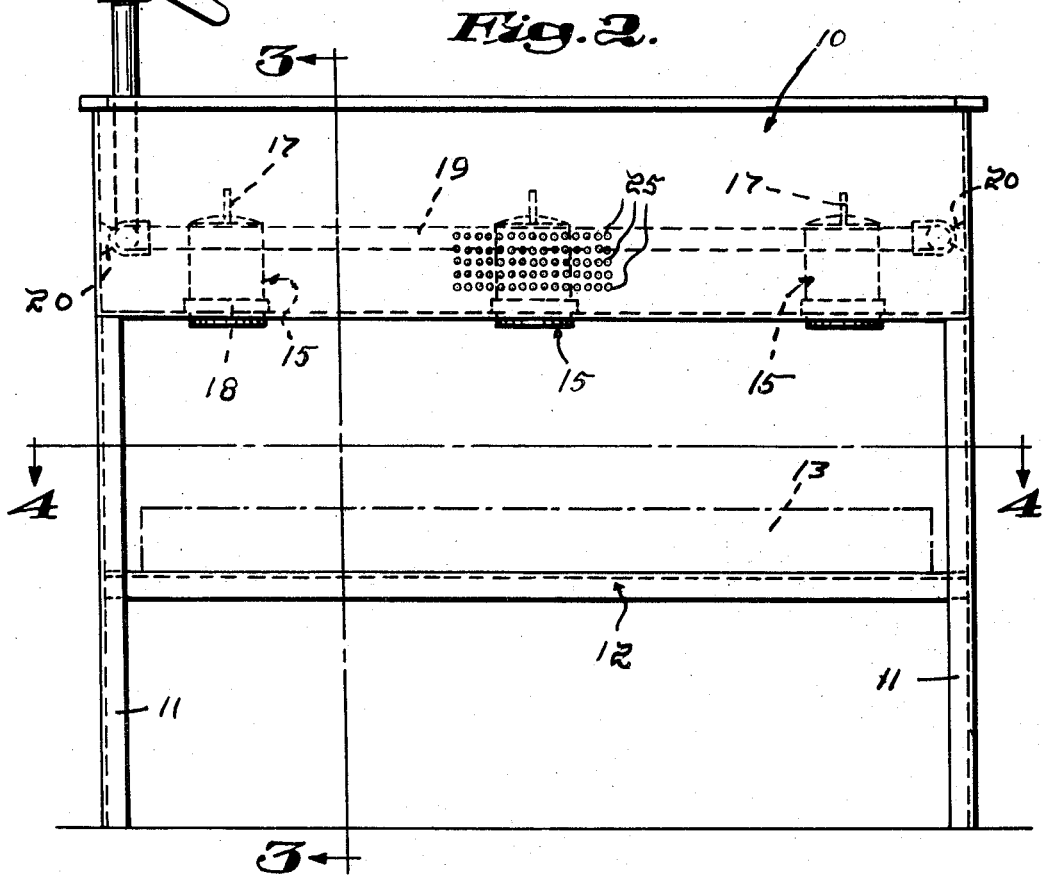
FIG. 2 is a side view thereof.

The shrimp washer illustrated by the drawings consists of a relatively deep pan or open tank 10 supported by legs 11 to which a shelf 12 is attached to enable a relatively shallow tray 13 for washed shrimp to be located below the wash pan 10. Alternatively, the washed shrimp may be collected in a hopper or deposited on and carried away by a conveyor.

The bottom of the wash pan 10 has a plurality of ports 14 and these are shown as arranged as three longitudinally spaced pairs, the ports of each pair being transversely spaced and all ports being spaced a substantial distance from the walls of the wash pan 10.

The ports 14 are closed by members generally indicated at 15 and of substantial cross sectional dimensions and serving both as baffles and as removable overflows. To that end, each member 15 is shown as tubular with its upper end closed by a crowned screen 16 and provided with a lifting handle 17. Each member is dimensioned to fit and close any one of the ports 14 and adjacent its lower end has a collar 18 that seats on the bottom of the wash pan 10.

The members 15 are surrounded by a header 19 supported as at 20 by the end walls of the wash pan 10 and provided, at one end wall, with a vertical pipe 21 including a valve 22 and connectable to a suitable water source. In practice, water pressure in the neighborhood of 100 PSL ensures maximum effectiveness. The header 19 is provided with jet-establishing ports disposed downwardly towards the members 15 and preferably arranged in two series, the ports 23 of one series downwardly inclined towards the bottom of the pan at an angle different from that of the ports 24 of the other series and preferably the ports of the two series alternate from end-to-end of the header. With a header 19 one inch in diameter and the above mentioned water pressure, ports in the order of one-sixteenth of an inch provide effective jets. The ports 23 are downwardly inclined at an angle of 45° while the ports 24 are downwardly inclined at an angle of 30° so that, as shown in FIG. 3, water jets are delivered towards the bottom of the wash pan 10 in the field defined by the header 19. With this arrangement, the water jets cause turbulence as the water level builds up in the wash pan 10 which turbulence is aided by the members 15.

The usual procedure is to dump in a batch of shrimp with all the elements 15 in place and with the valve 22 open, the water jets, particularly as the water level builds up in the pan 10, result in such turbulence that the shrimp are swirled about, wet quickly and thoroughly washed. Once the shrimp have been washed, desirably several if not all of the elements 15 are removed to flush the washed shrimp through the ports 14. The elements 15 are then replaced and another batch of shrimp is then dumped into the pan 10 in which wash water has already accummulated.

It will be noted that one side of the washing pan 10 is provided with a series of vertically spaced longitudinal rows of drainage ports 25 through which dirt may escape as the water level builds up therein, and at the appropriate level, water can also overflow and escape through the members 15.

By way of example and not by way of limitation, the wash pan may be about four feet long and two feet wide, dimensions that readily accommodate a fifty pound batch of shrimp at a time and with the indicated water pressure, that batch can be washed in about ninety seconds if very dirty and usually in much less time.

I claim:

1. A batch washer for shrimp comprising a pan having a series of drainage ports in the bottom thereof, a header supported within said pan and including portions defining a field within which a batch of shrimp is to be deposited on the pan bottom, opposed portions of said header having jet-establishing ports spaced lengthwise thereof that are downwardly and inwardly inclined to provide spray directly on the pan bottom, and baffle means centrally positioned within said field on said pan bottom and operable when the header is in communication with a source of water under pressure, to cooperate with the resulting sprays to create such turbulence that the shrimp are freed of eggs, dirt, and mud as they are swirled about, said baffle means including a baffle member for each drainage port removably seated therein and closing it.

2. The shrimp washer of claim 1 in which each baffle member is tubular, a screen closes its upper end and its lower end is dimensioned to extend through said port and includes a collar dimensioned to rest on said pan bottom.

3. A batch washer for shrimp comprising a pan, a header supported within the pan above the bottom thereof and including portions defining a field within which a batch of shrimp is to be deposited on said pan bottom, opposed portions of said header having jet-establishing ports spaced lengthwise thereof, said ports inclined downwardly towards the pan bottom and towards each other and disposed to deliver spray along separate paths directly into said field when the header is in communication with a source of water under pressure, and two series of parallel baffle means equally spaced from the longitudinal center line of said pan bottom and said baffle means of each series being equally spaced from each other between the spray paths and operable in conjunction with said sprays to create such turbulence that the shrimp are freed of eggs, dirt, and mud as they are swirled about in the pan.

4. The shrimp washer of claim 3 in which the baffle means also includes an overflow.

* * * * *